US010397873B2

(12) United States Patent
Bhanage

(10) Patent No.: US 10,397,873 B2
(45) Date of Patent: Aug. 27, 2019

(54) RF SIGNATURE-BASED WLAN IDENTITY MANAGEMENT

(71) Applicant: Aruba Networks, Inc., Sunnyvale, CA (US)

(72) Inventor: Gautam Bhanage, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/958,243

(22) Filed: Apr. 20, 2018

(65) Prior Publication Data

US 2018/0249416 A1    Aug. 30, 2018

Related U.S. Application Data

(63) Continuation of application No. 14/712,191, filed on May 14, 2015, now Pat. No. 9,998,998.

(51) Int. Cl.
*H04L 29/12*      (2006.01)
*H04W 12/08*     (2009.01)
(Continued)

(52) U.S. Cl.
CPC ....... *H04W 52/0245* (2013.01); *H04W 12/08* (2013.01); *H04L 61/6022* (2013.01);
(Continued)

(58) Field of Classification Search
CPC ............. H04W 52/0245; H04W 12/08; H04W 12/0808; H04W 12/1008–1204; H04W 48/02; H04W 48/16; H04W 48/08; H04L 61/6022; Y02D 70/142; Y02D 70/168; Y02D 70/00
See application file for complete search history.

(56) References Cited

U.S. PATENT DOCUMENTS

2004/0235465 A1    11/2004  Hawe
2007/0025245 A1     2/2007  Porras et al.
(Continued)

OTHER PUBLICATIONS

PCT International Search Reported cited in PCT/US2016/032277, dated Aug. 8, 2016; 3 pages.

*Primary Examiner* — Eric Myers
(74) *Attorney, Agent, or Firm* — Hewlett Packard Enterprise Patent Department

(57) ABSTRACT

MAC addresses provide a way to identify wireless client devices. Some wireless client devices are able to change their MAC addresses. Provided are devices computer-program products, and methods for identifying wireless client devices based on radiofrequency signatures of transmissions from the client devices. In some implementations, one or more wireless frames are received at a network device. In these implementations, a wireless frame is received at two or more antennas. In some implementations, a signal characteristic associated with transmission of the wireless frame is monitored. In these implementations, monitoring the signal characteristic includes using two or more antennas to determine a physical or temporal characteristic associated with the transmission of the wireless frame. In some implementations, a client device is identified. The identified client device is associated with the transmission of the wireless frame. In these implementations, identifying the client device includes using the monitored signal characteristics.

20 Claims, 9 Drawing Sheets

(51) Int. Cl.
    *H04W 12/10*     (2009.01)
    *H04W 12/12*     (2009.01)
    *H04W 48/02*     (2009.01)
    *H04W 48/08*     (2009.01)
    *H04W 48/16*     (2009.01)
    *H04W 52/02*     (2009.01)

(52) U.S. Cl.
    CPC ........ *H04W 12/1008* (2019.01); *H04W 12/12* (2013.01); *H04W 48/02* (2013.01); *H04W 48/08* (2013.01); *H04W 48/16* (2013.01); *Y02D 70/00* (2018.01); *Y02D 70/142* (2018.01); *Y02D 70/168* (2018.01)

(56) References Cited

U.S. PATENT DOCUMENTS

| | | |
|---|---|---|
| 2008/0002606 A1 | 1/2008 | Cheung et al. |
| 2008/0209521 A1* | 8/2008 | Malaney ............ H04L 63/0492 726/4 |
| 2009/0305665 A1 | 12/2009 | Kennedy et al. |
| 2010/0030393 A1 | 2/2010 | Masters et al. |
| 2014/0150049 A1 | 5/2014 | Kwon et al. |
| 2014/0177499 A1 | 6/2014 | Twitchell, Jr. |
| 2015/0017991 A1 | 1/2015 | Tinnakornsrisuphap et al. |
| 2015/0341157 A1 | 11/2015 | Eltawil et al. |
| 2016/0295409 A1 | 10/2016 | Lee |

* cited by examiner

RF SIGNATURE-BASED WLAN IDENTITY MANAGEMENT

This application is a Continuation of U.S. patent application Ser. No. 14/712,191 filed on May 14, 2015, the content of which are incorporated herein by reference in its entirety. The Applicant hereby rescinds any disclaimer of claim scope in the parent application or the prosecution history thereof and advices the USPTO that the claims in this application may be broader than any claim in the parent application.

SUMMARY

Provided are devices computer-program products, and methods (e.g., methods implemented on a network device) for identifying wireless client devices based on radiofrequency signatures of transmissions from the client devices. In some implementations, one or more wireless frames are received at a network device. In these implementations, a wireless frame is received at two or more antennas. In some implementations, a signal characteristic associated with transmission of the wireless frame is monitored. In these implementations, monitoring the signal characteristic includes using two or more antennas to determine a physical or temporal characteristic associated with the transmission of the wireless frame. In some implementations, a client device is identified. The identified client device is associated with the transmission of the wireless frame. In these implementations, identifying the client device includes using the monitored signal characteristics.

In some implementations, monitoring signal characteristics includes measuring a difference in the signal characteristics as seen by two or more antennas. In some implementations, monitoring includes monitoring the signal characteristic for a pre-determined amount of time. In other implementations, identifying the client device includes changing the pre-determined amount of time. In these implementations, changing the pre-determined amount of time includes elongating or truncating the pre-determined amount of time.

In some implementations, signal characteristics include a received signal strength indicator. In some implementations, signal characteristics include a frequency offset. In some implementations, signal strength characteristics includes a timestamp. In these implementations, the timestamp indicates when the wireless frame was received by an antenna.

In some implementations, the identified client device is woken from a sleep mode. In these implementations, waking the client device includes transmitting a message that facilitates a response. The response includes a wireless frame.

In some implementations, the identified client device is blocked. In these implementations, blocking includes discarding a wireless frame corresponding to the identified client device.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

BRIEF DESCRIPTION OF THE DRAWINGS

Illustrative embodiments are described in detail below with reference to the following figures.

DETAILED DESCRIPTION

Devices within a network typically use one or more Media Access Control (MAC) addresses to identify themselves to other devices within the network. Network devices may, in turn, use another device's MAC address to identify and track frames to and from that device. One example of this interaction is a network that is watching for malicious client devices. A wireless client device may connect to an access point on the network and proceed to flood the network with inbound traffic, a form of attack called a denial of service attack. The flood of traffic may overwhelm the network, possibly disabling one or more parts of the network. The access point or a controller or some other device within the network, however, may be able to detect the attack before the attack does any damage. Using the malicious client device's MAC address, the access point can block the client device from connecting to the network, thereby stopping the attack. The malicious client device's MAC address can further be communicated across the network. The network can then bar the malicious client device from connecting anywhere, thereby preventing further attacks.

MAC addresses are used to identify client devices because MAC addresses were meant to be static and unique to each client device. Some wireless client devices, however, are able to change their MAC addresses quickly, frequently, and automatically, that is, without prompting from a user. A network may not be able to track the packets from these client devices. This creates a problem for network administration. In addition to detecting attacks to the network, the network may also foe tracking client device traffic for other reasons, such as balancing wireless usage across multiple access points to achieve better overall utilization. The network may thus benefit from another method for identifying client devices that does not rely on MAC addresses.

Wireless client devices use radio signals to communicate with the network. Radio signals have multiple physical and temporal characteristics. It is very difficult for two client devices to have the same transmission signal characteristics. Thus, by examining signal characteristics and possibly establishing a pattern of behavior, a network device may identify client devices, regardless of the client devices' MAC addresses.

I. Network Configurations

Figure 1:
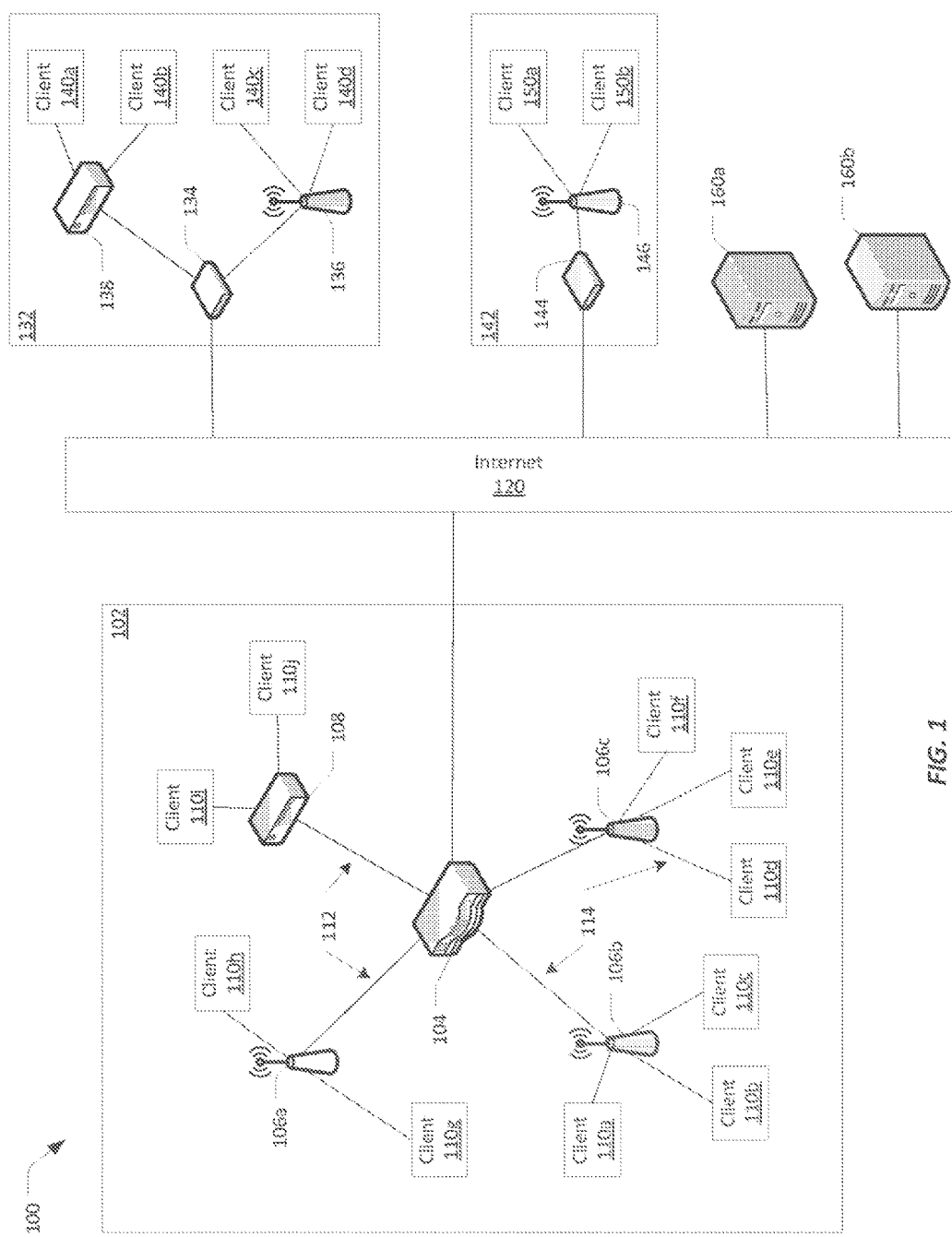
FIG. 1 illustrates one embodiment of a network configuration that may be implemented for a multi-user organization, such as a business, educational institution, governmental entity, or any other organization having multiple users and possibly multiple sites.

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, also in communication with the network 120.

The main office 102 may include a primary network, possibly also called a corporate network or a home network. The main office 102 network may be a private network. A private network is a network that may include security and access controls, such that only certain users are authorized to access the private network. Authorized users may include, for example, employees of a company based in the main office 102.

In the illustrated embodiment, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 may be operable to configure and manage network devices, such as the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one more switches 108 and/or wireless access points 106a-c. Switches 108 and wireless access points 106a-c provide network connectivity to various client devices 110a-j. Using a connection to a switch 108 or access point 106a-c, a client device 110a-j is able to access network resources, including other devices on the network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual, terminals, video game consoles, and the like.

Within the main office 102, a switch 108 is included as one example of a point of access to the network for wired client devices 110i-j. Client devices 110i-j may connect to the switch 108 and through the switch 108 may be able to access other devices within the network configuration 110. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless access points 106a-c are included as another example of a point of access to the network for client devices 110a-h. An access point 106a-c is a combination of hardware, software, and/or firmware that is configured to provide wireless network connectivity to wireless client devices 110a-h. In the illustrated embodiment, the access points 106a-c can be managed and configured by the controller 104. The access points 106a-c communicate with the controller 104 and the network over either wired 112 or wireless 114 connections.

The network configuration 100 may include one or more remote sites 132, 142. A remote site 132 may be located in a different physical or geographical location from the main office 102. In some cases, the remote site 132 may be in the same geographical location, or possibly the same building, as the main office 102, but lacks a direct connection to the network located within the main office 102, relying instead on a connection over a different network 120. A remote site 132 such as the one illustrated may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or access point 136 in communication with the gateway 134 over either wired or wireless connections. The switch 138 and access point 136 provide connectivity to the network for various client devices 140a-d.

In various embodiments, the remote site 132 is in direct communication with main office 102, such that client devices 140a-d at the remote site 132 access the network resources at the main office 102 as if these clients 140a-d were located at the main office 102. In such embodiments, the remote site 132 is managed by the controller 104 at the main office, and the controller 104 provides the necessary connectivity, security, and accessibility that enable the remote site's 132 communication with the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless access point 146, by which various client devices 150a-b access the network 120. Such a remote site 142 may represent, for example, an individual employee's home or a temporary remote office. The remote site 142 may also be in communication with the main office 102, such that the client devices 150a-b at remote site 142 access network resources at the main office 102 as if those client devices 150a-b were located at the main office 102. The remote site 142 may be managed by the controller 104 at the main office 102 to make this transparency possible.

Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include any number of intermediate network devices, such as switches, routers, gateways, servers, and/or controllers, that are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
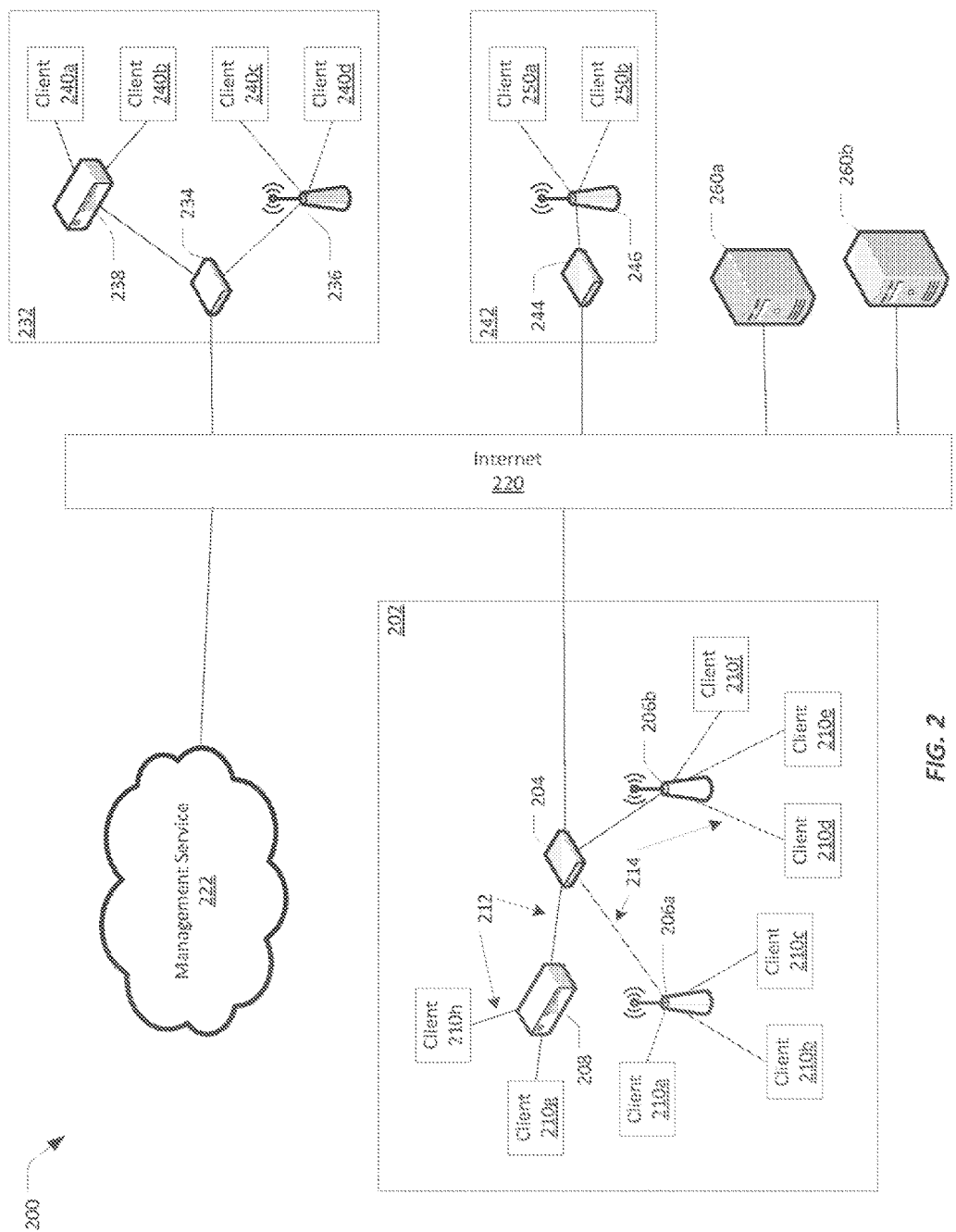
FIG. 2 illustrates an embodiment of a network configuration that includes a cloud-based management service.

FIG. 2 illustrates an embodiment of a network configuration 200 that includes a cloud-based management service 222. The network configuration 200 may be implemented for a multi-user organization. The network configuration 200 includes a main office 202 in communication with a network 220, and may also include one or more remote sites 232, 242, also in communication with the network 220. In the illustrated embodiment, the main office 202 includes a gateway device 204, such as a router, for communicating with the network 220. A single gateway device 204 is illustrated, though the main office 202 may include multiple gateway devices and/or multiple communication points with the network 220.

The gateway device 204 may be in communication with one or more switches 208 and/or wireless access points 206a-b. Routers 208 and access points 206a-b provide network connectivity to various client devices 210a-h. Using a connection to a switch 208 or access point 206a-b, a client device 210a-h is able to access network resources, including other devices on the network and the network 220.

A switch 208 is included as an example of a point of access to the network for client devices 210g-h. Client devices 210g-h may communicate with the switch 208 over a wired 212 connection. Wireless access points 206a-b are included as another example of a point of access to the network for client devices 210a-f. Client devices 210a-f may communicate with the access points 206a-b over wireless 214 connections. The access points 206a-b may themselves communicate with the gateway device 204 over either wired 212 or wireless 214 connections.

In some embodiments, the network configuration 200 may include a cloud-based management service 222. The management service 222 may include various software and software processes for configuring and/or managing network devices at the main office 202. Management tasks may include, for example, access, authentication, security, hardware management, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the network 220.

The network configuration 200 may include one or more remote sites 232, 242. A remote site 232 may include a gateway device 234 for communicating with the network 220. The remote site 232 may also include a switch 238 and/or access point 236 in communication with the gateway device 234 over either wired or wireless connections. The switch 238 and access point 236 provide connectivity to the network 220 for various client devices 240a-d.

In various embodiments, the remote site 232 may be configured and/or managed by the management service 222, such that client devices 240a-d at the remote site 232 access the network resources at the main office 202 as if these clients 240a-d were located at the main office 202. The management service 222 provides the necessary connectivity, security, and accessibility that enable the remote site's 232 communication with the main office 202.

In various embodiments, the network configuration 200 may also include one or more smaller remote sites 242, comprising only a gateway device 244 for communicating with the network 220 and a wireless access point 246, by which various client devices 250a-b access the network 220. The remote site 242 may also be configured and/or managed by the management service 222, such that the client devices 250a-b at the remote site 242 access network resources at the main office 202 as if these client devices 250a-b were located at the main office 202. The management service's 222 control over the remote site 242 makes this transparency possible.

The network 120 may be a public network, such as the Internet. The network 120 may include various content servers 260a-b. The client devices 210a-h, 240a-d, 250a-b may request and access data and content provided by the content servers 260a-b over their connection to the network 120.

II. Establishing Client Device Identity

The various devices, including controllers, switches, access points, routers, gateway devices of FIGS. 1-2, client devices and other devices connected to a network typically have one or more Media Access Control (MAC) addresses. MAC addresses are usually assigned by the manufacturer of the device. Each network interface on a device may have a different MAC address. For example, a laptop that includes a wired Ethernet port and a Wi-Fi antenna may have two MAC addresses, one each for the Ethernet interface and Wi-Fi interface. The MAC address may be stored in the hardware of a network interface controller (NIC) in read-only memory or some other firmware mechanism. In networks based on the Institute of Electrical and Electronics Engineers (IEEE) 802.111 standard, including Ethernet and Wi-Fi networks, a MAC address may also be called a device's network address.

Figure 3A:
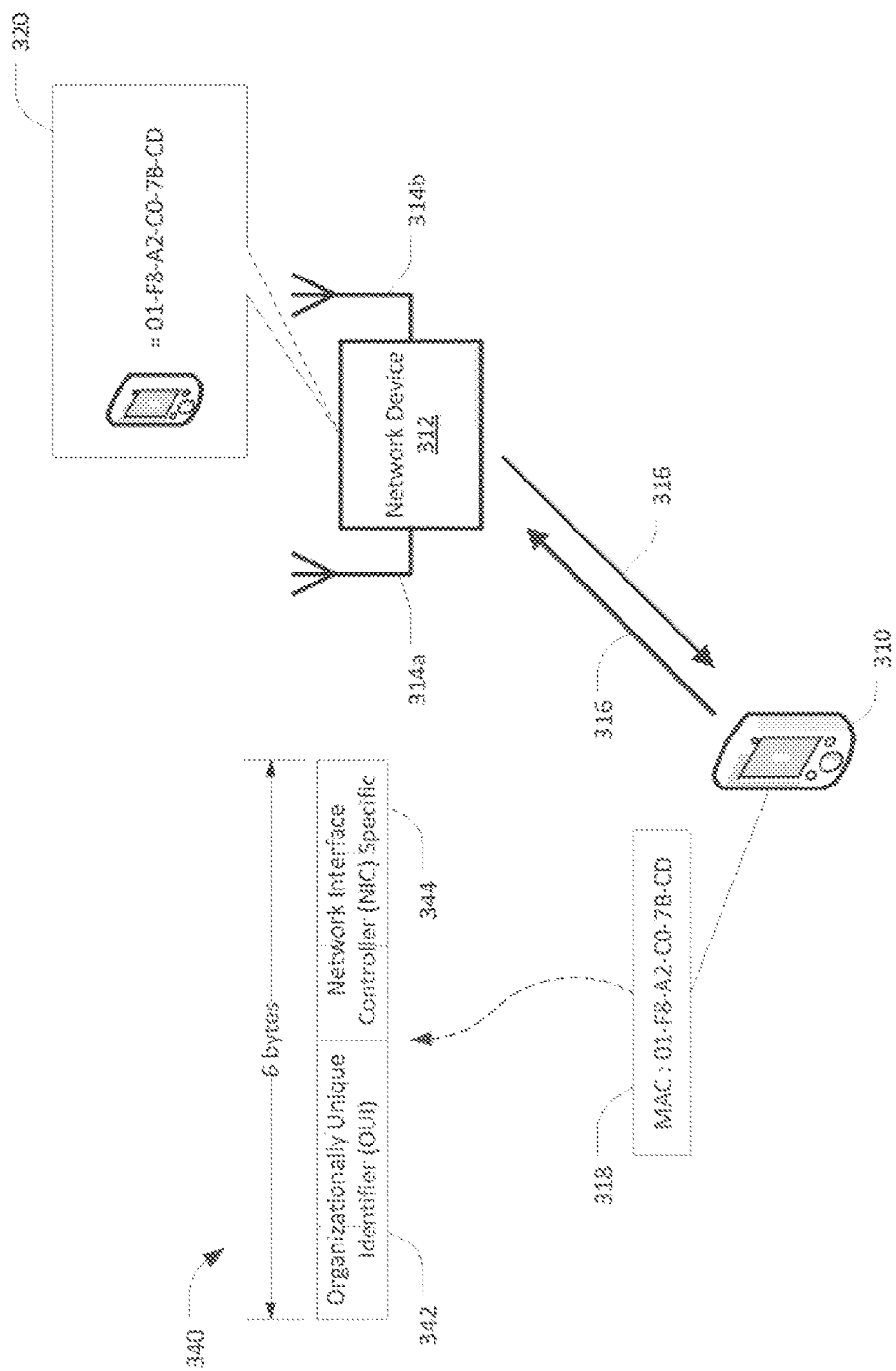
FIG. 3A illustrates an example of how a MAC address may be used to identify a client device.

MAC addresses are intended to uniquely identify each network interface of a device. By extension, a MAC address can also be used to uniquely identify a client device. FIG. 3A illustrates an example of how a MAC address may be used to identify a client device 310, FIG. 3A illustrates an example of a client device 310 in communication with a network device 312. The client device 310 transmits wireless frames 316 to the network device 312, and receives wireless frames 316 from the network device 312. The network device 312 includes two or more antennas 314a-b for receiving and transmitting wireless frames 316. The antennas 314a-b may also be referred to as antenna chains or radio chains, both of which refer to a single receiver, transmitter, or transceiver. The network device 312 may be, for example, an access point, a router, a controller, a wireless base station, or any other device capable of transmitting and receiving wireless frames 316. "Frames" as used herein means frames that can include packets, or may be used interchangeably with "packets," unless stated otherwise.

The client device 310 in the illustrated example includes a Wi-Fi interface for transmitting and receiving wireless frames 316. The Wi-Fi interface has a MAC address 318. A MAC address may be between six or eight bytes, or possibly more, depending on the communication standard implemented by a given network interface. A common format is the 48-bit/6-byte address format 340. In this format, the MAC address is divided into two parts: a three-byte Organizationally Unique Identifier (OUI) 342 part and a three-byte Network Interface Controller (NIC) Specific 344 part. The OUI 342 part typically identifies a vendor, manufacturer, or other organization. OUIs are assigned at a global level, such that an organization's OUI 342 is unique across the world. The organization chooses the format and value for the NIC-specific 344 part, though the NIC-specific 344 part is intended to be unique to each individual network interface produced by the organization. MAC addresses can be globally administered or locally administered. Locally administered addresses are assigned to the device by a network administrator, overriding the address assigned by the manufacturer. Locally administered addresses may have an all zero or otherwise blanked out or removed OUI 342 part.

The 48-bit 340 MAC address format can be found, for example, in networks implementing Ethernet, 802.11 wireless protocols, and networks implementing Internet Protocol version 4 (IPv4). Networks implementing Internet Protocol version 6 (IPv6) and other networks use a 64-bit/8-byte MAC address format. In the 64-bit format, the NIC-specific part is five bytes long.

The network device 312 typically uses the client device's 310 MAC address 318 to identify 320 and track the client device 310. The MAC address 318 is considered a reliable identifier because it is expected to be unique and static, though, as explained below, this may not always be the case. In the illustrated example, the network device 312 identifies and tracks the client device 310 using the client device's 310 MAC address. In some cases, another component or device in communication with the network device 312 may identify 320 and track client devices. The network device 312 may have an auxiliary component for managing client device identities, or the network device 312 may be in communication with, for example, a separate controller that manages client device identities. In other cases, the client devices' 310 identity may be tracked in multiple places within a network.

The network device 312 learns of a client device's 310 MAC address 318 through the wireless frames 316 from the client device 310. Frames from the client device 310 typically include the MAC address 318 as a source address for the frame. The source address may also be used as the destination address for frames sent to the client device 310. The network device 312 may read frames from the client device 310 and extract the client device's MAC address 318. The network device 312 may then store the MAC address 318. The network device 312 may use the stored MAC address to track any further wireless frames 316 to and from the network device 312, and/or provide other services based on the identity 320 of the client device 310.

The network device 312 may keep track of client device identities for several reasons. The network device 312 (or, as noted above, another device within the network) may, for example, monitor the traffic to and from the client device 310. Monitoring traffic may allow the network to manage network traffic, and possibly improve the overall utilization of the network. For example, the network may move wireless client devices from an overburdened access point to an access point that is less heavily burdened. Monitoring traffic may also allow the network to detect a client device that is behaving badly. For example, a client device that is attempting a denial of service attack can be blacklisted, that is, can be barred from connecting to the network. Identifying client devices may also be used for other purposes, such as monitoring security, locating senders of malware or viruses, providing Wi-Fi-based location services, developing statistical information about network usage, and the like.

Figure 3B:
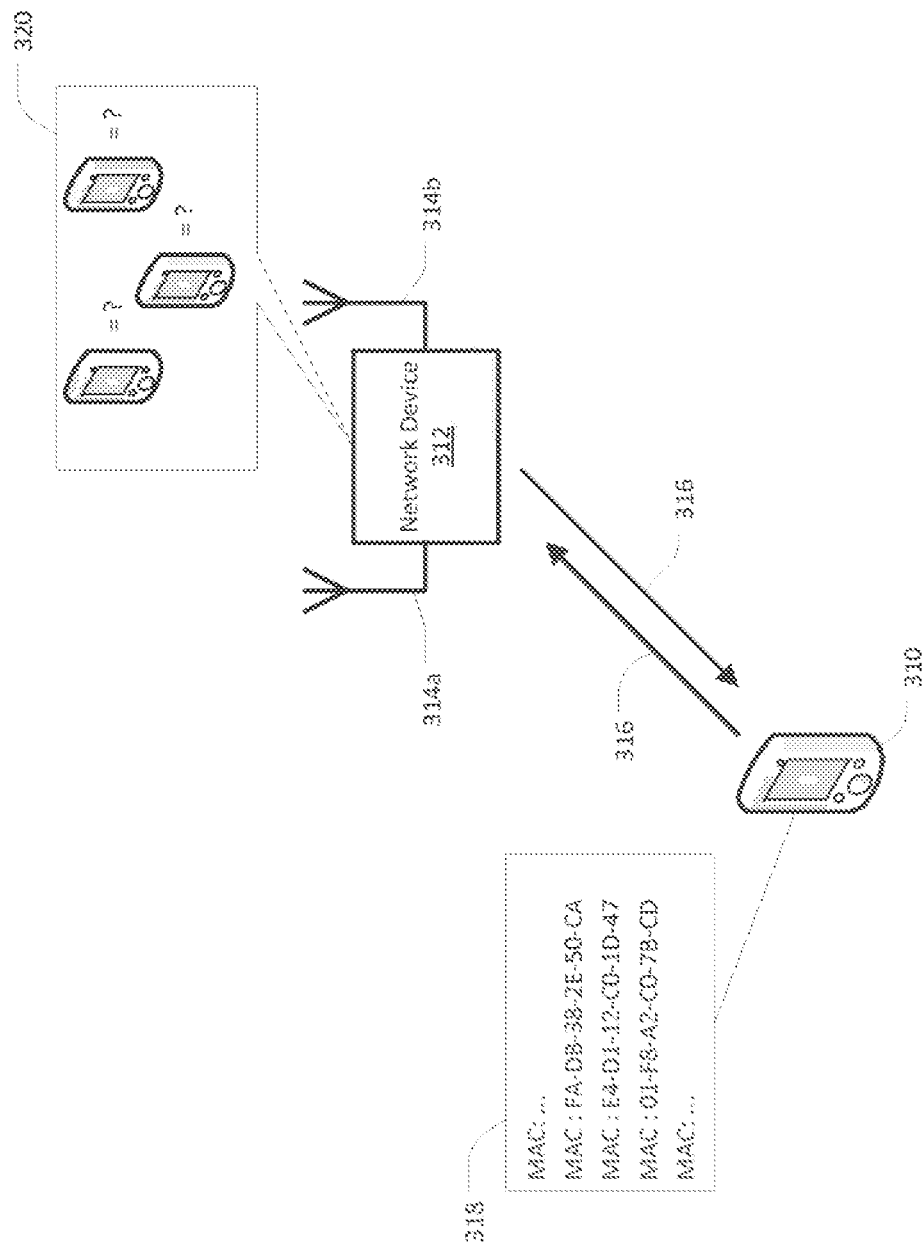
FIG. 3B illustrates an example of one way in which a client device can become unidentifiable to a network device.

In some cases, however, these services no longer function when the network is no longer able to identify a specific client device. FIG. 3B illustrates an example of one way in which a client device 310 can become unidentifiable to a network device 312. In the illustrated example, the client device 310 is able to change its MAC address 318. The client device 310 may be provided, for example, with an operating system function that enables transmission of random or pseudo-random MAC addresses. Alternatively or additionally, the client device 310 may have special purpose hardware or firmware that enables a similar function. The client device 310 may change its MAC address 318 periodically or at random time intervals. As a result, the client device 310 may appear, to the network device 312, as more than one client device. Stated another way, the network device may associate the stream of MAC addresses 318 transmitted from the client device 310 as a series of different client devices, each attaching to the network device 312. Furthermore, the network device 312 may determine that each of this stream of different client devices disconnects and leaves the network after sending only a few frames. The client device's 310 ability to connect to and communicate with the network device 312 is unaffected, but the network device 312 may no longer be able to identify 320 the client device, 310, nor track the wireless frames 316 to and from the client device 310.

Another client identification problem is caused by spoofing of MAC addresses. Spoofing of MAC addresses occurs when a client device or other network device uses the MAC address of another device within the network. In other words, the client or network device "pretends" to be a different device on the network. As a result, the network may identify wireless frames coming from the client device as coming from the other device. Client and network devices may spoof a MAC address for legitimate reasons, but in some cases the client or network device may be doing so for malicious reasons. In either case, the device that is doing the spoofing sometimes cannot be independently identified.

Losing the ability to track client devices creates problems for network administration. The network may no longer be able to track or balance network usage. The network may also no longer be able to blacklist client devices that are behaving badly. Location services based on client device identification may no longer work. A network would therefore benefit from a method and system for identifying client devices that does not rely on MAC addresses alone.

III. RF-Signature-Based Client Device Identification

Wireless network devices, such as access points, collect information about transmissions from client devices, in addition to MAC addresses. This information includes signal characteristics, that is, characteristics of the signals transmitted from the client devices. Each client device may have nearly unique transmission signal characteristics. If two client devices are placed side by side or even stacked on top of one another, the two client devices may still have unique signal characteristics. By monitoring the characteristics of the transmitted signals from a client device, a network device may be able to uniquely identify the client device. Moreover, because transmission signal characteristics have the distinctiveness of a fingerprint, the network device may be able to uniquely identify all client devices associated with the network device, regardless of which MAC address each client device chooses to use.

Figure 4A:
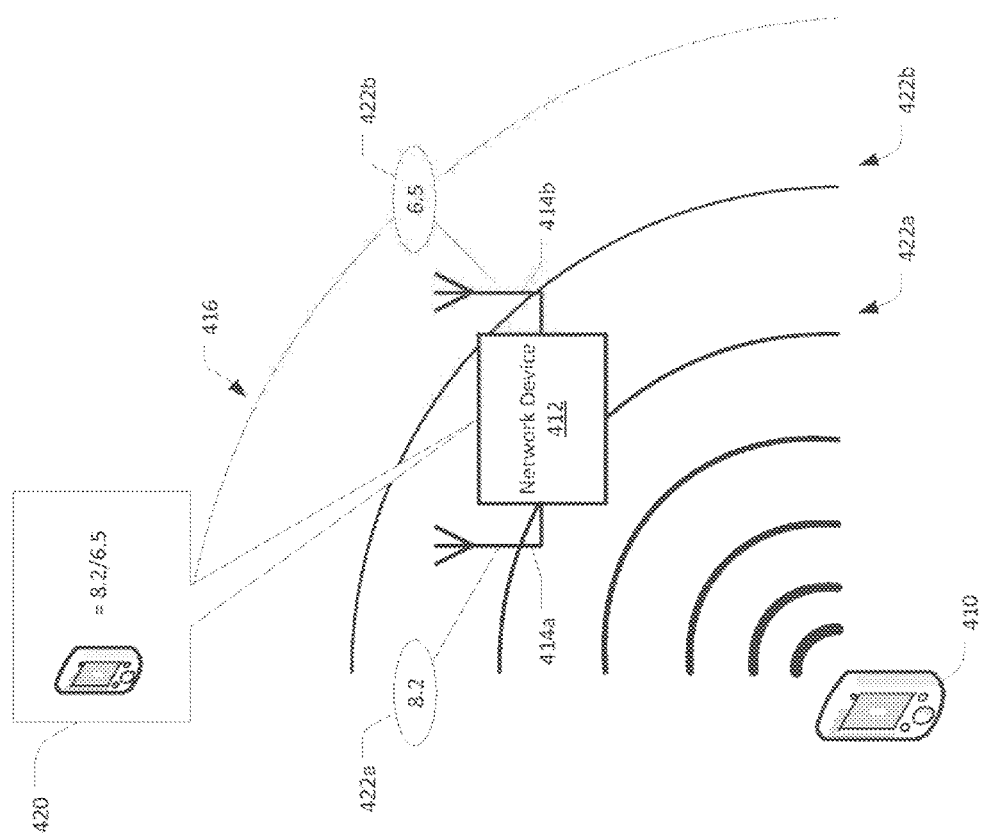
FIG. 4A illustrates an example of identifying a client device using received signal strength.
Figure 4B:
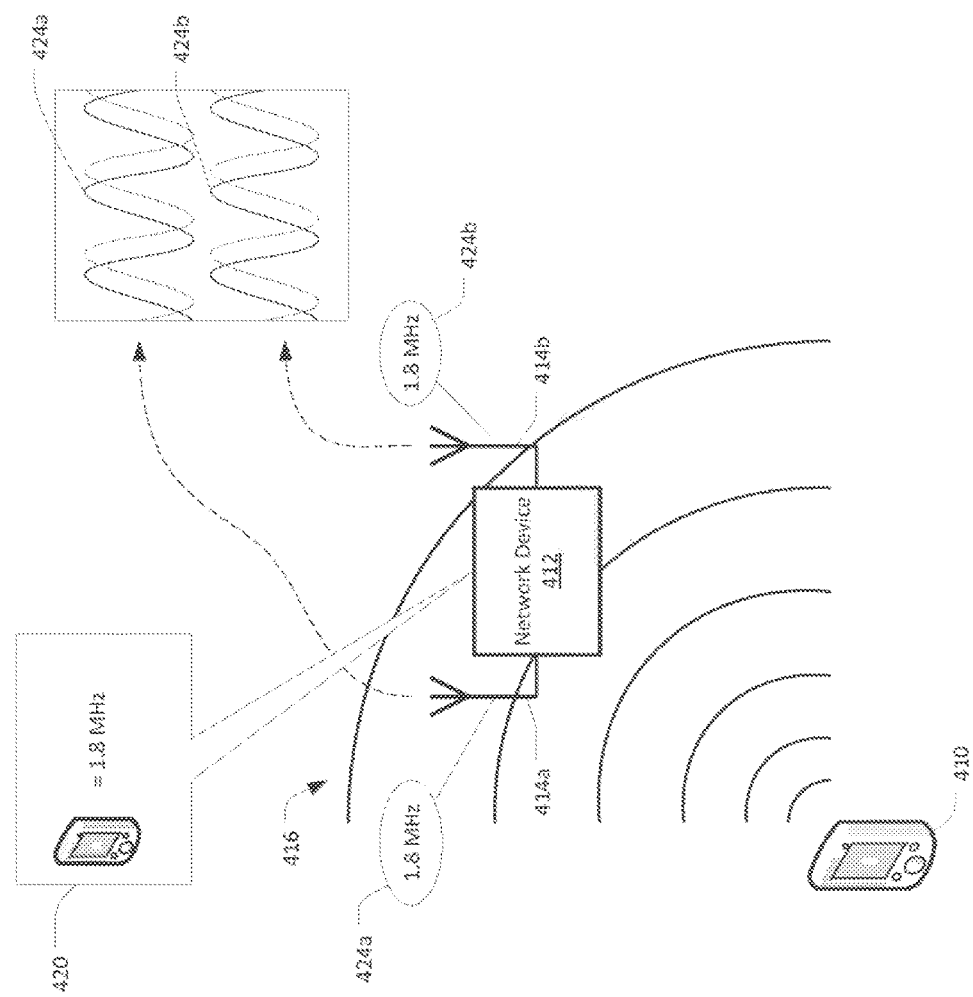
FIG. 4B illustrates an example of using frequency offsets to identify a client device.
Figure 4C:
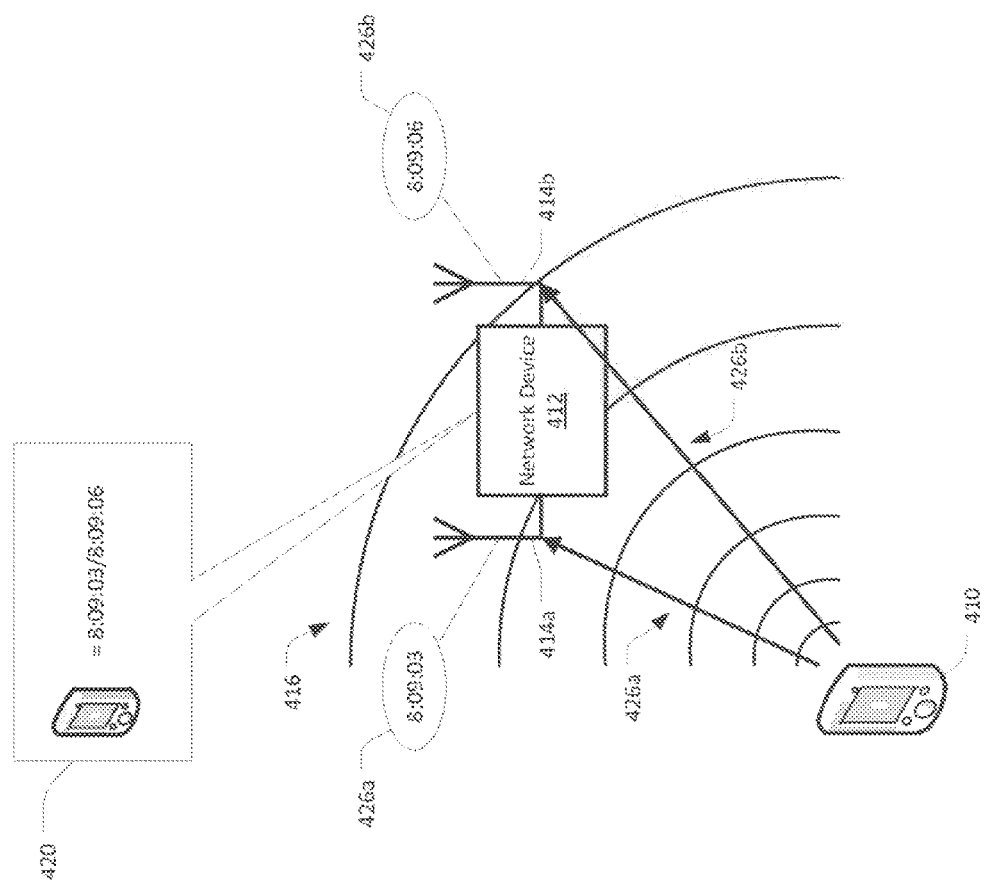
FIG. 4C illustrates an example of using received timestamps to identify a client device.

FIGS. 4A-4C illustrate examples of signal characteristics that may be used to identify a client device 410. FIGS. 4A-4C illustrate an example of a client device 410 in communication with a network device 412. The client device 410 transmits and receives wireless frames to and from the network device 412. The network device 412 includes two or more antennas 414a-b for receiving and transmitting wireless frames. The network device 412 may be, for example, an access point or some other network device capable of transmitting and receiving wireless frames.

The wireless frames are transmitted by the client device 410 using radio signals 416. Radio signals have many physical and temporal characteristics, such as, for example, a signal-to-noise ratio, a signal strength, a signal quality (indicating how accurately or error-free the signal is received), a phase difference, a received power, a received timestamp (indicating the time at which the signal was received), a frequency offset and range, a download speed range, an upload speed range, a channel, and/or a round-trip time (the length of time for the signal to be sent plus the length of time until an acknowledgment of that signal is received). Furthermore, a wireless signal may also have channel state information (CSI). Channel state information refers to known properties of a communication link. This information describes how a signal propagates from the transmitter to the receiver, and represents the combined effect of, for example, scatter, fading, and power decay with distance.

FIG. 4A illustrates an example of identifying 420 a client device using received signal strength (RSSI). A radio signal loses strength as it propagates away from the source of the signal. RSSI is a measure of that signal strength at a receiving antenna. The network device's 412 two antennas 414a-b may measure different RSSI 422a-b for the same signal 416 used to transmit a wireless frame. In the illustrated example, the first antenna 414a measures 8.2 422a, while the second antenna 414b measures 6.4 422b, indicating that the second antenna 414b is further away from the source of the signal 416. Note that the numbers used in this example are merely illustrative, and are not meant to reflect actual RSSI values. The network device 412 may use the absolute RSSI 422a-b for each antenna to identify 420 the client device 410. Alternatively or additionally, the network device 412 can use the difference between the measured RSSI 422a-b to identify the client device 410. Even when the antennas 414a-b measure the same RSSI, the network device 412 can use the RSSI to identify the client device 410. This is because the absolute values of and/or the differences between the measures RSSI are likely to be unique to the client device 410.

By using multiple antennas 414a-b, the network device 412 can take advantage of the multiple paths the signal 416 may take to reach each antenna 414a-b. Some network devices already employ multiple antennas to cope with the effects of multipath. Multipath is a phenomenon that occurs when radio frequency signals reflect off objects in their path. A network device may receive both the primary signal and one or more reflections of the same signal. In some cases, the network device may receive only reflected signals, such as when the transmitting device does not have a direct line of sight to the network device. Multiple antennas overcome multipath effects because each antenna provides a different view of the transmitted signal and its reflections. The network device may use diversify algorithms to determine the strongest or clearest signal from among the primary and reflected signals. In some cases, the network device may select the antenna with the strongest reception, and use that antenna to receive the signal. In other cases, the network device may combine the signals from all the antennas to produce a strong and high quality signal. In yet other cases, the network device may both select and/or combine receive signals, depending on the current situation. The network device may further automatically adjust to a different version of the signal as environmental conditions change.

Using signal characteristics to identify client devices may take advantage of multiple antennas in the same manner. With only one antenna it may be difficult to distinguish the RSSI of one client device from another. For example, when two client devices are far away, the signals from each client device may be quite weak, and thus have nearly the same RSSI. Two antennas, however, are likely to receive two different views of the RSSI of a signal from a single client device. For example, because of multipath effects, one antenna may receive only a reflected version of the signal, while the other antenna may receive the signal directly. Moreover, a signal from a second client device is unlikely to reach the antennas by the same paths: even if the two client devices are very close to each other, the signals from the second client device will bounce off of objects at different angles, and thus reach the antennas by different paths than would signals from the first client device. Two antennas are therefore better able to distinguish one signal from another—and thus one client device from another—than would be possible with only one antenna. Some network devices have more than two antennas. Additional antennas provide even more views of a signal, and thus may provide a more accurate identification of the sender of the signal.

Monitoring the RSSI 422a-b measured by the antennas 414a-b over an interval of time may also provide a more accurate identification than would a single measurement. The RSSI 422a-b of signals transmitted by the client device 410 can vary over time, both because the client device 410 may be moving, and/or because the environment around the client device 410 may be changing. An interval of time can be used, for example, to maintain a moving window of RSSI 422a-b samples for each client device associated with the network device 412 and for each antenna 414a-b. Further, the samples may be used to calculate a moving average for the window of time. A moving average may provide a current pattern of behavior for the client device 410. The samples may also be used to calculate a standard deviation of the samples. A standard deviation may provide an expected behavior for the client device 410. At any given time, the network device 412 may compare the moving average against the standard deviation. When the moving average is within the standard deviation, then it is likely that the client device 410 has been identified. When the moving average is outside the standard deviation, then it is likely that a different client device has been identified. This may be the case when, for example, the different client device has spoofed the MAC address of the client device 410. When this is the case, the network device 412 may attempt to match the moving average of the different client device against stored standard deviations, and thereby identify the different client device.

One example of the calculations described above is as follows. Assume that there are (i) client devices associated with the network device, and that the network device has (k) antennas. The network device may maintain a window of samples S for the RSSI per client device (i) per antenna (k). For these samples S, the network device may calculate a moving average, MovAVG(S(i, k)). The network device may also calculate a standard deviation STDEV(S(i, k)). To use the moving average and standard deviation to identify a client device, the network device may, for each frame received from the client device (i), calculate D(i, k)=MovAVG(S(i, k))−R(i, k), where R(i, k) is a measured RSSI value per client (i) per antenna (k). The network device may further calculate whether D is within the standard deviation by evaluating modulo(D(i, k))>L*STDDEV(S(i, k)), where L is an adjustable multiplier, further explained below. When mod(D(i, k) is greater, the D(i, k) is set to 1 in the next step; otherwise, it is set to 0. Finally, the network device may evaluate whether $\Sigma_{k=0}^{n} D(i, k) > T$, where T is a threshold. These calculations attempt to determine the number of antennas for which the RSSI is more than L standard deviations outside of the moving average. For example, setting the threshold to two means that when the RSSI values measured by at least two antennas are outside the standard deviation, then the client device that provided the moving average is not the same client device that provided the standard deviation. In this example, the network device may have identified a client device (the one that provided the moving average) has spoofed another client device (the one that provided the standard deviation). When the threshold is not reached, then the network device has successfully identified a client device.

Other methods may be used to correlate the measured RSSI 422a-b values over time to identify the client device 410. Furthermore, the time interval used for the moving window samples can be varied. For example, a longer time interval may be used to identify client devices more accurately. A longer time window provides more samples, for example, to average over. Greater accuracy may be advantageous in a stable and relatively static environment, where the client devices are expected to be known and trustworthy. A private, secure office building is one example of such an environment. A shorter time interval may be used to identify client devices more quickly. A shorter time window reduces the time used to identify client devices. Faster identification may be advantageous in a more dynamic and less secure environment, where it may be desirable to quickly identify client devices. Public Wi-Fi systems, such as may be found in libraries or coffee shops, are examples of dynamic environments.

Sampling of signal characteristics may occur during re-association of the client device 410 with the network device 412. Re-association typically occurs when a client device disconnects from one wireless network device and connects to a different wireless network device. The client device may transmit a re-association request frame to the new network device, which may include the client device's MAC address. The new network device may thereafter forward any frames buffered by the prior network device to the client device. In some cases, however, the client device 410 may begin transmitting re-association frames only because it has switched MAC addresses. The client device 410 in these cases may transmit the re-association frames to the same network device 412. To the network device 412, the client device 410 appears to be a new client device. In some cases, upon establishing an association in this manner, the client device 410 may use the MAC address transmitted with the re-association frames for a short period. In these cases, the network device 412 may sample the RSSI 422a-b during the re-association phase. The re-association phase typically lasts a few milliseconds, which in most cases is sufficient time to gather enough samples to identity a client device.

In some cases, the client device 410 may stop transmitting before the network device 412 has collected sufficient RSSI measurements to make an identification. For example, the client device 410 may have entered a sleep mode, possibly disabling its radios and/or powering down. In these cases, the network device 412 may wake the client device 410 and cause the client device 410 to transmit frames. For example, the network device 410 may transmit null data frames that cause the client device 410 to respond with acknowledgment frames. The network device 412 may then use the signal characteristics of the acknowledgement frames to identity the client device 410.

RSSI, as illustrated in FIG. 4A, may by itself be a sufficiently distinctive signal characteristic to identify client devices. As noted above, however, wireless frames have other signal characteristics that can also be used. The preceding discussion of RSSI is meant to provide only an example of a signal characteristic, and how that signal characteristic may be used to identify a client device. Other signal characteristics can be substituted for RSSI in the above discussion, and be used in the same manner.

FIG. 4B illustrates an example of using frequency offsets 424a-b to identify a client device 410. Frequency offset here describes the difference between the frequency of the received signal and the expected frequency for that signal. Wireless transmission protocols typically use prescribed frequency bands. For example, the IEEE 802.11 standard uses 2.4, 3.6, 5, and 60 GHz. The network device 412 may be configured to provide one or more of these frequency bands. The client device 410 may use any of the provided frequency bands. Radio signals transmitted by the client device 410 may be offset 424a-b from the selected frequency, possibly to avoid interfering with other devices transmitting on the same frequency. The network device 412 may detect the frequency offset 424a-b. Over time, the network device 412 may be able to associate a specific offset 424a-b with a specific client device 410, and thereby identify that client device 410. In the illustrated example, the network device 412 has determined that the client device 410 is using a frequency offset of 1.8 MHz 424a-b. Multi-path effects, such as fading and interference, may make a frequency offset more difficult to detect. The two antennas 414a-b may provide a more exact offset by examining different versions of the transmitted signal 416.

FIG. 4C illustrates an example of using received timestamps 426a-b to identify a client device 410. A received timestamp is an absolute or relative time at which an antenna 414a-b receives a wireless frame from the client device 410. Propagation delays, caused by distance and/or interference caused by objects, may cause the signal 416 from the client device 410 to reach each antenna at slightly different times 426a-b. For example, the first antenna 414a may receive the signal 416 at 8:09:03 426a and the second antenna 414b may receive the signal 416 at 8:09:06. Note that the times given are merely representative and that the time difference is likely to be on the order of nanoseconds or smaller. By monitoring the received timestamps 426a-b for a brief period of time, the network device 412 can establish a pattern of behavior, and thereby identify the client device. In some cases, the received timestamps 426a-b provide enough information to uniquely identify the client device 410.

While each of the signal characteristics illustrated in FIGS. 4A-4C, and any others not specifically discussed, can each, alone, provide enough information to identify a client device, a combination of signal characteristics may provide a faster or more accurate identification. A combination of signal characteristics may provide a more complete picture of the radio frequency characteristics of a specific device. Having a more complete picture may allow a network device to more easily identify a client device.

Figure 5:
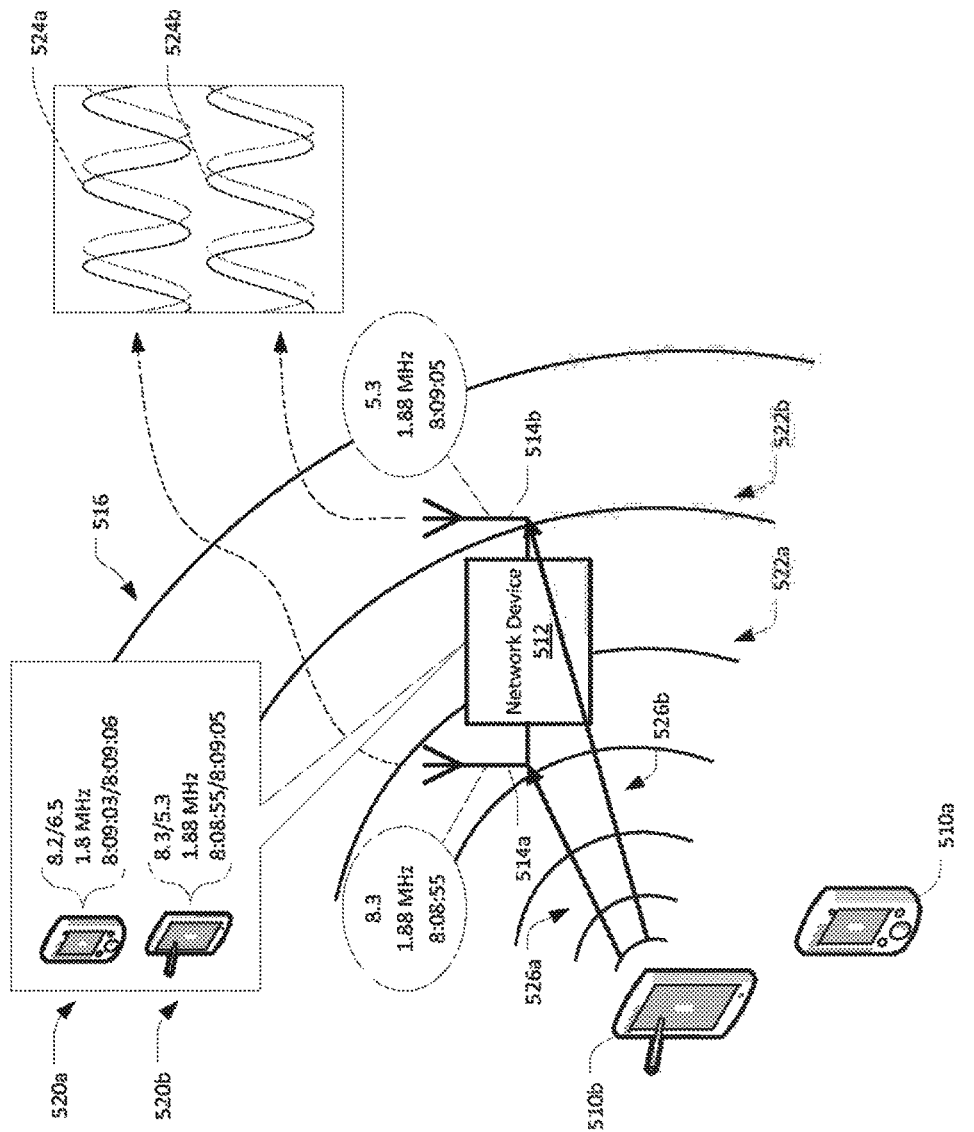
FIG. 5 illustrates an example of identifying a client device using RSSI, frequency offset, and received timestamps, and further illustrates that the signal characteristics for a second client device are likely to be different from the signal characteristics of a first client device.

FIG. 5 illustrates an example of the signal characteristics of a second device 510b, and shows that these signal characteristics can be used to differentiate the second client device from a first client device 510a. FIG. 5 also illustrates an example of using a combination of signal characteristics to identify a client device.

In the example of FIG. 5, two client devices 510a-b are illustrated as communicating wirelessly with a network device 512. The network device 512 includes two or more antennas 514a-b for receiving and transmitting wireless frames. For the sake of clarity, only signals 516 from the second client device 510b are illustrated. For purposes of this illustration, it is assumed that the first client device 510a has the RSSI, frequency offset, and received timestamps that are illustrated in FIGS. 4A-4C.

The second client device 510b is, for purposes of this example, located very near to the first client device 510a. Client devices that are very close to each other may be more difficult to identify because the signals transmitted by them may appear to the network device 512 to be from the same source. In contrast, client devices that are far apart are more likely to look like different signal sources, and therefore may be more easily identified. The network device 512, however, can distinguish even between client devices 510a-b placed very close together because of the multiple paths their signals will take to reach each of the network device's 512 antennas. Even when the client devices 510a-b are placed on top of one another, their signals are likely to take different paths to reach the antennas 514a-b. This enables the network device 512 to distinguish and identify the client device 510a-b.

In the illustrated example, the network device 512 has already identified 520a the first client device 510a. The network device 512 has detected RSSI of 8.2 at the first antenna 514a, and 6.2 at the second antenna 514b. Further, the network device 512 has determined that the first client device 510a is using a frequency offset of 1.8 MHz. Additionally, the network device 512 has recorded received timestamps of 8:09:03 and 8:09:06, indicating an average difference of 3 seconds difference. For the second client device 510b, the network device 512 has detected RSSI of 8.3 522a and 5.3 522b at the first 514a and second 514b antennas, respectively. The network device 512 has also determined that the second client device 510b is using a frequency offset of 1.88 MHz 524a-b. Additionally, the network device 512 has recorded received timestamps of 8:08:55 526a and 8:09:05 526b for the second client device, 510b, indicating an average difference of 10 seconds.

Based on the signal characteristics of the second client device 510b, the network device 512 is able to identify 520b the second client device 510b as different from the first client device 510a. Furthermore, over a short interval of time, the network device 512 may detect a consistency in the signal characteristics of the second client device 510b, and thereby identify additional wireless frames as originating from the second client device 510b.

As illustrated, using multiple signal characteristics provides a fuller picture and thus possibly a more accurate identification. Using multiple signal characteristics is analogous to using five fingerprints from one hand to make an identification instead of one fingerprint. One fingerprint may be, in many cases, sufficient, but having more fingerprints may make identification easier and less prone to false matches.

Using signal characteristics to identify client devices can continue to function even when the client devices move. Moving changes the path of signals from the client device to the network device. The network device, however, is typically able to sample the signals and identify the client device faster than the client device is able to move. Should the client device move out of the range of the network device, the client device will no longer be sending frames to the network device, and the network device will no longer need to identify the client device.

Using signal characteristics to identify client devices also may solve the problem of MAC address spoofing. A network device that is relying on signal characteristics to identify a client device, instead of MAC addresses, might not be fooled. The network device may further notice that a MAC address is being spoofed, and identify the client device that is doing the spoofing. The client device may be reported or even blacklisted.

IV. Network Device

Figure 6:
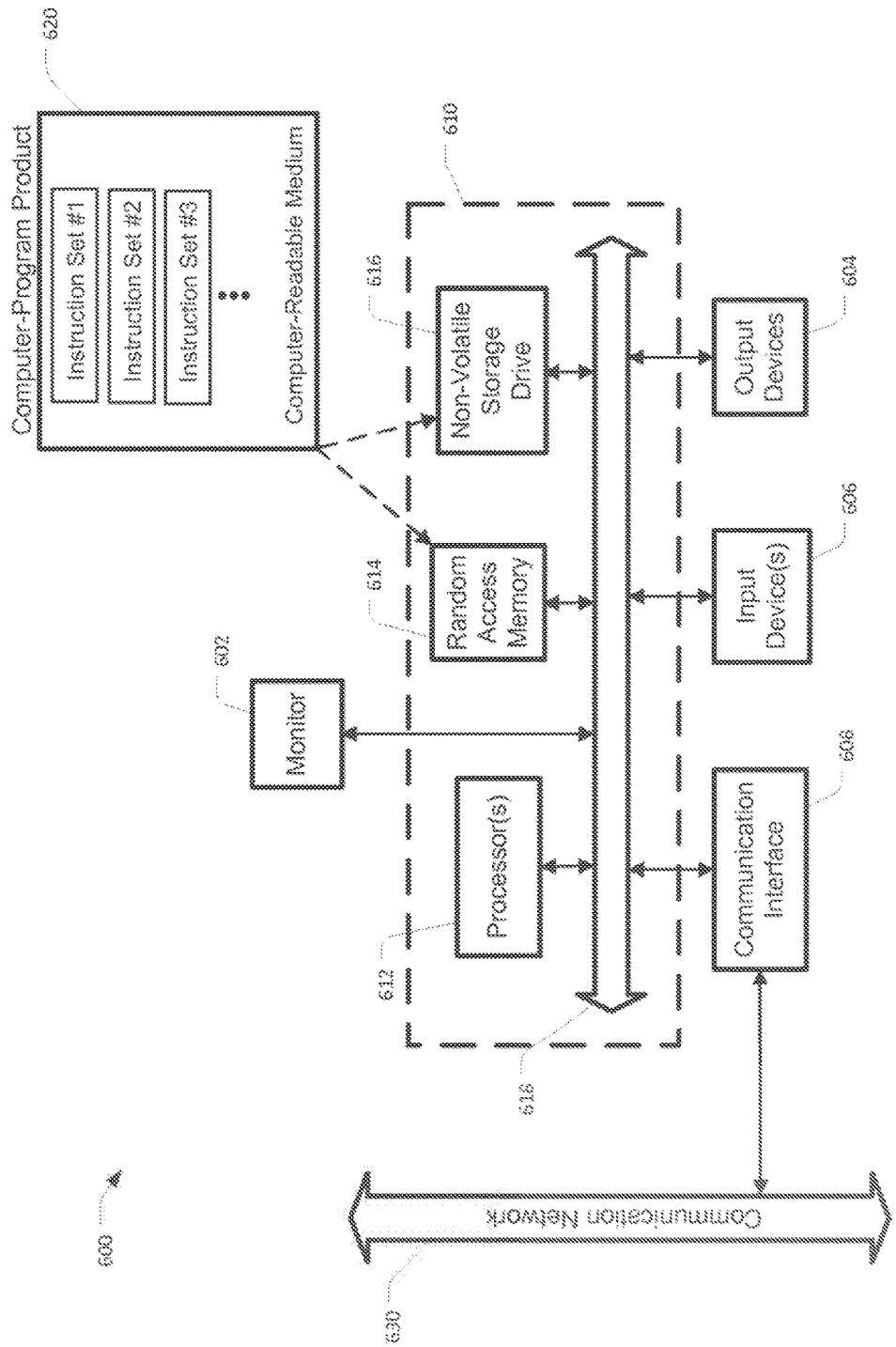
FIG. 6 illustrates an embodiment of a special-purpose computer system.

FIG. 6 illustrates an embodiment of a network device 600. The above methods may be implemented by computer-program products that direct a network device to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof.

The network device 600 comprises a processing system 610, an optional monitor 602 coupled to the processing system 610, one or more optional user output devices 604 coupled to the processing system 610, one or more optional user input devices 606 (e.g., keyboard, mouse, track ball, touch screen) coupled to the processing system 610, an optional communications interface 608 coupled to the processing system 610, a computer-program product 620 stored in a tangible computer-readable memory in the processing system 610. The computer-program product 620 directs the network device 600 to perform the above-described methods. The processing system 610 may include one or more processors 612 that communicate with a number of peripheral devices via a bus subsystem 618. These peripheral devices may include the user output device(s) 604, user input device(s) 606, communications interface 608, and a storage subsystem, such as a random access memory (RAM) 614 and/or a non-volatile storage drive 616 (e.g., disk drive, optical drive, solid state drive), which are forms of tangible computer-readable memory.

The computer-program product 620 may be stored in the non-volatile storage drive 616 and/or another computer-readable medium accessible to the processing system 610 and loaded into the memory 614. Each processor 612 may comprise a microprocessor, such as a microprocessor from Intel® or Advanced Micro Devices, Inc.®, or the like. To support the computer-program product 620, the processing system 600 runs an operating system that handles the communications of the computer-program product 620 with the above-noted components, as wed as the communications between the above-noted components in support of the computer-program product 620. Exemplary operating systems include ArubaOS from Aruba Networks, Windows® or the like from Microsoft Corporation, Solaris® from Sun Microsystems, LINUX, UNIX, and the like, and/or device- or system-specific operating systems and the like.

The user input devices 606 may include a keyboard, a keypad, a mouse, a scanner, a digital drawing pad, a touch screen incorporated into the display, audio input devices such as voice recognition systems, microphones, and other types of input devices. In various embodiments, the user input devices 606 are typically embodied as a computer mouse, a trackball, a track pad, a joystick, wireless remote, a drawing tablet, or a voice command system. The user input devices 606 typically allow a user to select objects, icons, text and the like that appear on the monitor 602 via a command such as a click of a button or the like. The user output devices 604 include devices and mechanisms to output information from the processing system 610. These may include a display (e.g., a monitor 602), printers, non-visual displays such as audio output devices, etc.

The communications interface 608 provides an interface to communication networks 630 and devices and may serve as an interface to receive data from and transmit data to other systems, WANs and/or the Internet. Embodiments of the communications interface 608 may be an Ethernet card, a modem, a cable modem, a router, a switch, an embedded multimedia adapter (EMTA), a synchronous or asynchronous digital subscriber line (DSL) unit, a FireWire® interface, a USB® interface, a wireless network adapter, and the like. For example, the communications interface 608 may be coupled to a computer network, to a FireWire® bus, or the like. In other embodiments, the communications interface 608 may be physically integrated on a board of the processing system 610, and/or may be a software program, or the like.

The RAM 614 and non-volatile storage drive 616 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 614 and non-volatile storage drive 616 may be configured to store the basic programming and data constructs that provide the functionality of various embodiments of the systems and methods described above.

Software instruction sets that provide the functionality of the described methods may be stored in the RAM 614 and/or non-volatile storage drive 616. These instruction sets or code may be executed by the processor(s) 612. The RAM 614 and/or non-volatile storage drive 616 may also provide a repository to store data and data structures used in accordance with the disclosed systems and methods. The RAM 614 and non-volatile storage drive 616 may include a number of memories including a main random access memory (RAM) to store instructions and data during program execution and a read-only memory (ROM) in which fixed instructions are stored. The RAM 614 and non-volatile storage drive 616 may include a file storage subsystem providing persistent (non-volatile) storage of program and/or data files. The RAM 614 and non-volatile storage drive 616 may also include removable storage systems, such as removable flash memory.

The bus subsystem 618 provides a mechanism to allow the various components and subsystems of the computer 610 to communicate with each other as intended. Although the bus subsystem 618 is shown schematically as a single bus, alternative embodiments of the bus subsystem 618 may implement multiple busses or communication paths within the computer 610.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figures. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation, of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory of number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method comprising:
receiving, by a first antenna and a second antenna at a network device, a plurality of signals from at least one client device within a predetermine amount of time;
determining, by the network device, an average signal strength value and a signal strength standard deviation value based on the plurality of signals received by the first antenna and the second antenna;
for each respective antenna, calculating, by the network device, a difference between the average signal strength value and a measured signal strength value of each respective signal received by each respective antenna;
aggregating, by the network device, the calculated difference for the first antenna and the second antenna to determine a total difference;
in response to the total difference being within a predetermined multiplier of the signal strength standard deviation, determining that the plurality of signal strength values corresponding to the plurality of signals received by the first antenna and the second antenna uniquely identifies a particular client device.

2. The method of claim 1, further comprising:
in response to the total difference being above a predetermined multiplier of the signal strength standard deviation, determining that the plurality of signals are received by the first antenna and the second antenna from at least two different client devices.

3. The method of claim 1, wherein the average signal strength value comprises an average of a plurality of received signal strength indicator (RSSI) values corresponding to the plurality of signals received by the first antenna and the second antenna.

4. The method of claim 1, wherein the first antenna and the second antenna receive at least one of the plurality of signals via different paths.

5. The method of claim 4, wherein the first antenna receives a reflected version of the at least one of the plurality of signals, and wherein the second antenna receives a direct version of the at least one of the plurality of signals.

6. The method of claim 1, further comprising:
monitoring a plurality of physical and temporal signal characteristics for the pre-determined amount of time;
calculating a second difference between an average physical and temporal signal characteristic value and a measured physical and temporal signal characteristic value of each respective signal received by each respective antenna with respect to each of the plurality of physical and temporal signal characteristics;
in response to an aggregated second difference being within the predetermined multiplier of the physical and temporal signal characteristic standard deviation, determining that the plurality of physical and temporal signal characteristic values corresponding to the plurality of signals received by the first antenna and the second antenna uniquely identifies a particular client device.

7. The method of claim 6, wherein the a plurality of physical and temporal signal characteristics comprise: a signal-to-noise ratio, a signal quality, a phase difference, a received power, a received timestamp, a frequency offset and range, a download speed range, an upload speed range, a channel, a round-trip time, and a channel state information.

8. A network device, comprising:
a first antenna,
a second antenna,
a memory,
a processor executing instructions stored in the memory to:
receive, by the first antenna and the second antenna, a plurality of signals from at least one client device within a predetermine amount of time;
determine an average signal strength value and a signal strength standard deviation value based on the plurality of signals received by the first antenna and the second antenna;
for each respective antenna, calculate a difference between the average signal strength value and a measured signal strength value of each respective signal received by each respective antenna;
aggregate the calculated difference for the first antenna and the second antenna to determine a total difference;
in response to the total difference being within a predetermined multiplier of the signal strength standard deviation, determining that the plurality of signal strength values corresponding to the plurality of signals received by the first antenna and the second antenna uniquely identifies a particular client device.

9. The network device of claim 8, wherein the processor further executes the instructions stored in the memory to:
determine that the plurality of signals are received by the first antenna and the second antenna from at least two different client devices in response to the total difference is above a predetermined multiplier of the signal strength standard deviation.

10. The network device of claim 8, wherein the average signal strength value comprises an average of a plurality of received signal strength indicator (RSSI) values corresponding to the plurality of signals received by the first antenna and the second antenna.

11. The network device of claim 8, wherein the first antenna and the second antenna receive at least one of the plurality of signals via different paths.

12. The network device of claim 11, wherein the first antenna receives a reflected version of the at least one of the plurality of signals, and wherein the second antenna receives a direct version of the at least one of the plurality of signals.

13. The network device of claim 8, wherein the processor further executes the instructions stored in the memory to:
monitor a plurality of physical and temporal signal characteristics for the pre-determined amount of time;
calculate a second difference between an average physical and temporal signal characteristic value and a measured physical and temporal signal characteristic value of each respective signal received by each respective antenna with respect to each of the plurality of physical and temporal signal characteristics;
in response to an aggregated second difference being within the predetermined multiplier of the physical and temporal signal characteristic standard deviation, determine that the plurality of physical and temporal signal characteristic values corresponding to the plurality of signals received by the first antenna and the second antenna uniquely identifies a particular client device.

14. The network device of claim 13, wherein the a plurality of physical and temporal signal characteristics comprise: a signal-to-noise ratio, a signal quality, a phase difference, a received power, a received timestamp, a frequency offset and range, a download speed range, an upload speed range, a channel, a round-trip time, and a channel state information.

15. A non-transitory machine-readable storage medium encoded with instructions executable by at least one processor of a network device, the machine-readable storage medium comprising instructions to:
- receive, by a first antenna and a second antenna, a plurality of signals from at least one client device within a predetermine amount of time;
- determine an average signal strength value and a signal strength standard deviation value based on the plurality of signals received by the first antenna and the second antenna;
- for each respective antenna, calculate a difference between the average signal strength value and a measured signal strength value of each respective signal received by each respective antenna;
- aggregate the calculated difference for the first antenna and the second antenna to determine a total difference;
- in response to the total difference being within a predetermined multiplier of the signal strength standard deviation, determining that the plurality of signal strength values corresponding to the plurality of signals received by the first antenna and the second antenna uniquely identifies a particular client device.

16. The non-transitory machine-readable storage medium of claim 15, wherein the processor further executes the instructions stored in the memory to:
- determine that the plurality of signals are received by the first antenna and the second antenna from at least two different client devices in response to the total difference is above a predetermined multiplier of the signal strength standard deviation.

17. The non-transitory machine-readable storage medium of claim 15, wherein the average signal strength value comprises an average of a plurality of received signal strength indicator (RSSI) values corresponding to the plurality of signals received by the first antenna and the second antenna.

18. The non-transitory machine-readable storage medium of claim 15,
- wherein the first antenna and the second antenna receive at least one of the plurality of signals via different paths;
- wherein the first antenna receives a reflected version of the at least one of the plurality of signals, and
- wherein the second antenna receives a direct version of the at least one of the plurality of signals.

19. The non-transitory machine-readable storage medium of claim 15, wherein the processor further executes the instructions stored in the memory to:
- monitor a plurality of physical and temporal signal characteristics for the pre-determined amount of time;
- calculate a second difference between an average physical and temporal signal characteristic value and a measured physical and temporal signal characteristic value of each respective signal received by each respective antenna with respect to each of the plurality of physical and temporal signal characteristics;
- in response to an aggregated second difference being within the predetermined multiplier of the physical and temporal signal characteristic standard deviation, determine that the plurality of physical and temporal signal characteristic values corresponding to the plurality of signals received by the first antenna and the second antenna uniquely identifies a particular client device.

20. The non-transitory machine-readable storage medium of claim 15, wherein the a plurality of physical and temporal signal characteristics comprise: a signal-to-noise ratio, a signal quality, a phase difference, a received power, a received timestamp, a frequency offset and range, a download speed range, an upload speed range, a channel, a round-trip time, and a channel state information.

* * * * *